US012322544B2

(12) United States Patent
Nonoyama

(10) Patent No.: US 12,322,544 B2
(45) Date of Patent: Jun. 3, 2025

(54) PURGE VALVE DRIVING CONTROL DEVICE

(71) Applicant: BOSCH CORPORATION, Tokyo (JP)

(72) Inventor: Takashi Nonoyama, Kanagawa (JP)

(73) Assignee: BOSCH CORPORATION, Tokyo (JP)

( * ) Notice: Subject to any disclaimer, the term of this patent is extended or adjusted under 35 U.S.C. 154(b) by 0 days.

(21) Appl. No.: 18/560,622

(22) PCT Filed: Mar. 11, 2022

(86) PCT No.: PCT/JP2022/010978

§ 371 (c)(1), (2) Date: Nov. 13, 2023

(87) PCT Pub. No.: WO2022/239446

PCT Pub. Date: Nov. 17, 2022

(65) Prior Publication Data

US 2024/0258005 A1 Aug. 1, 2024

(30) Foreign Application Priority Data

May 11, 2021 (JP) ................................ 2021-080337

(51) Int. Cl.
*H01F 7/18* (2006.01)
*F02D 41/00* (2006.01)

(52) U.S. Cl.
CPC ......... *H01F 7/1844* (2013.01); *F02D 41/004* (2013.01); *H01F 2007/1866* (2013.01)

(58) Field of Classification Search
CPC ........... H01F 7/1844; H01F 2007/1866; F02D 41/004
See application file for complete search history.

(56) References Cited

U.S. PATENT DOCUMENTS 5,173,188 A * 12/1992 Winter .................... G21F 5/015 422/256
5,250,195 A * 10/1993 Winter .................... F04B 9/042 422/256
(Continued)

FOREIGN PATENT DOCUMENTS

JP H0784655 A 3/1995
JP H07293732 A 11/1995
(Continued)

OTHER PUBLICATIONS

Translation of International Search Report for Application No. PCT/JP2022/010978 dated May 24, 2022 (3 pages).

*Primary Examiner* — Joseph J Dallo
(74) *Attorney, Agent, or Firm* — Michael Best & Friedrich LLP

(57) ABSTRACT

Provided is a purge valve driving control device capable of detecting abnormality by utilizing an existing circuit as much as possible while securing resolution and accuracy of solenoid resistance value detection. A battery voltage is applied to one end of a solenoid 1*a* through a first connection terminal 3*a*, and the other end is connected to a second connection terminal 3*b*. In a driver circuit 120, a drive transistor 4 and a shunt resistor 5 are connected in series between the second connection terminal 3*b* and a ground, and an overcurrent detection circuit 11 that enables detection of occurrence of an overcurrent in the drive transistor 4 on the basis of a voltage of the shunt resistor 5 is provided, and a microcomputer 110 is configured to be able to determine presence or absence of occurrence of battery short-circuit equivalent to an electrical short-circuit state of the first connection terminal 3*a* and the second connection terminal 3*b* on the basis of an output of the overcurrent detection circuit 11.

3 Claims, 8 Drawing Sheets

(56) References Cited

U.S. PATENT DOCUMENTS

| | | | | | |
|---|---|---|---|---|---|
| 5,268,102 | A * | 12/1993 | Clay | G01F 1/34 | 422/256 |
| 5,268,103 | A * | 12/1993 | Jameson | F04B 9/042 | 422/256 |
| 5,635,070 | A * | 6/1997 | Allington | B01D 11/0407 | 210/416.1 |
| 5,653,885 | A * | 8/1997 | Jameson | G01N 1/34 | 422/69 |
| 5,690,828 | A * | 11/1997 | Clay | G21F 5/015 | 210/744 |
| 6,176,227 | B1 * | 1/2001 | Ohuchi | F02D 41/0042 | 123/295 |
| 2005/0074983 | A1 * | 4/2005 | Shinriki | F16K 51/02 | 438/785 |
| 2008/0064227 | A1 * | 3/2008 | Kim | C23C 16/45561 | 257/E21.477 |
| 2015/0140835 | A1 * | 5/2015 | Tateno | H01L 21/67109 | 118/724 |

FOREIGN PATENT DOCUMENTS

| | | | | |
|---|---|---|---|---|
| JP | 2007010563 | A | 1/2007 | |
| JP | 2008182874 | A | 8/2008 | |
| JP | 2013199874 | A | 10/2013 | |
| JP | 2017008888 | A | 1/2017 | |
| KR | 101957485 | B1 | 3/2019 | |
| WO | WO-2006028215 | A1 * | 3/2006 | H01L 21/02178 |
| WO | WO-2008045202 | A2 * | 4/2008 | H01L 21/02164 |
| WO | WO-2015060069 | A1 * | 4/2015 | H01J 37/32009 |
| WO | 2018047553 | A1 | 3/2018 | |
| WO | 2018198631 | A1 | 11/2018 | |

* cited by examiner

[FIG. 1]
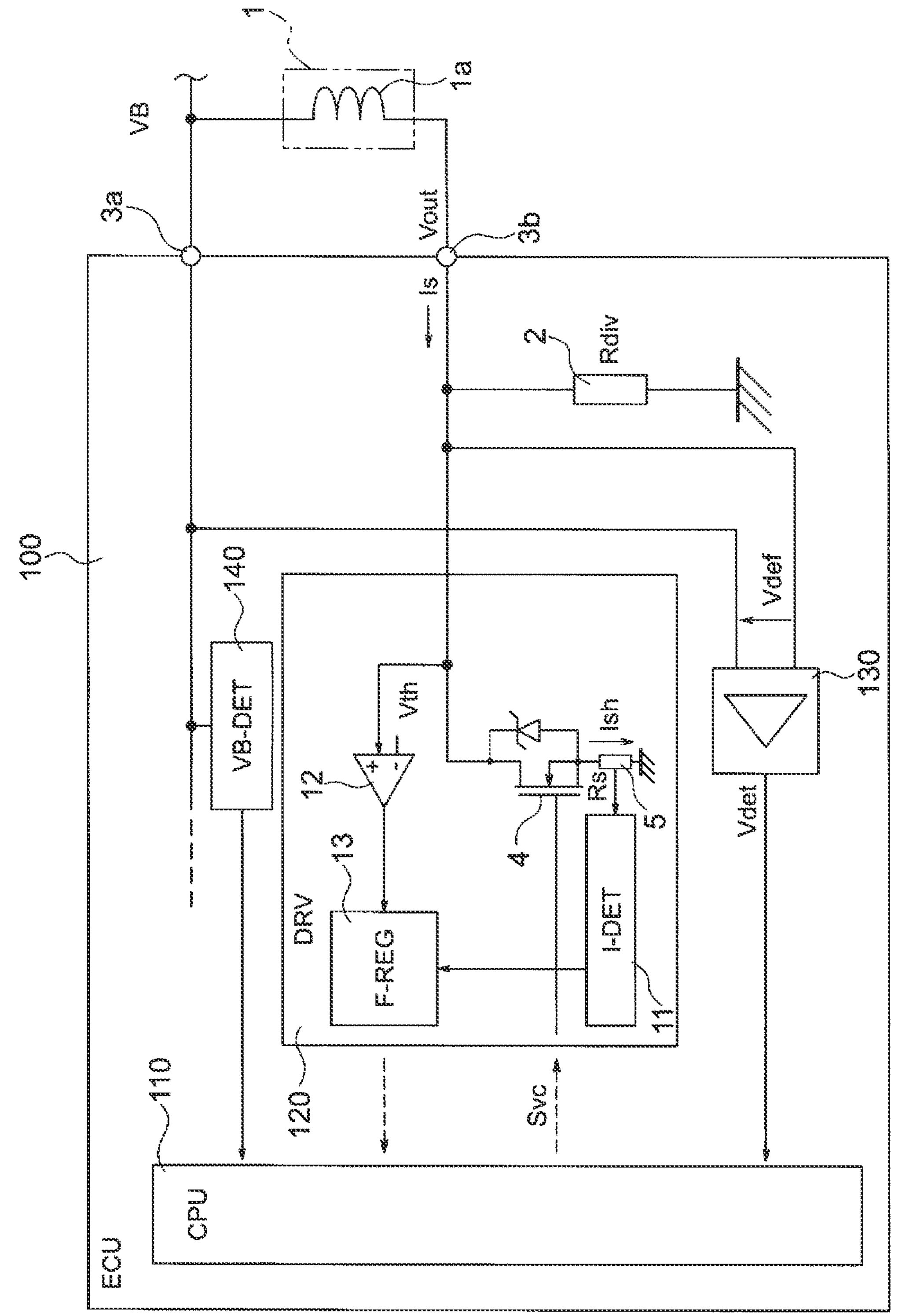

[FIG. 2]
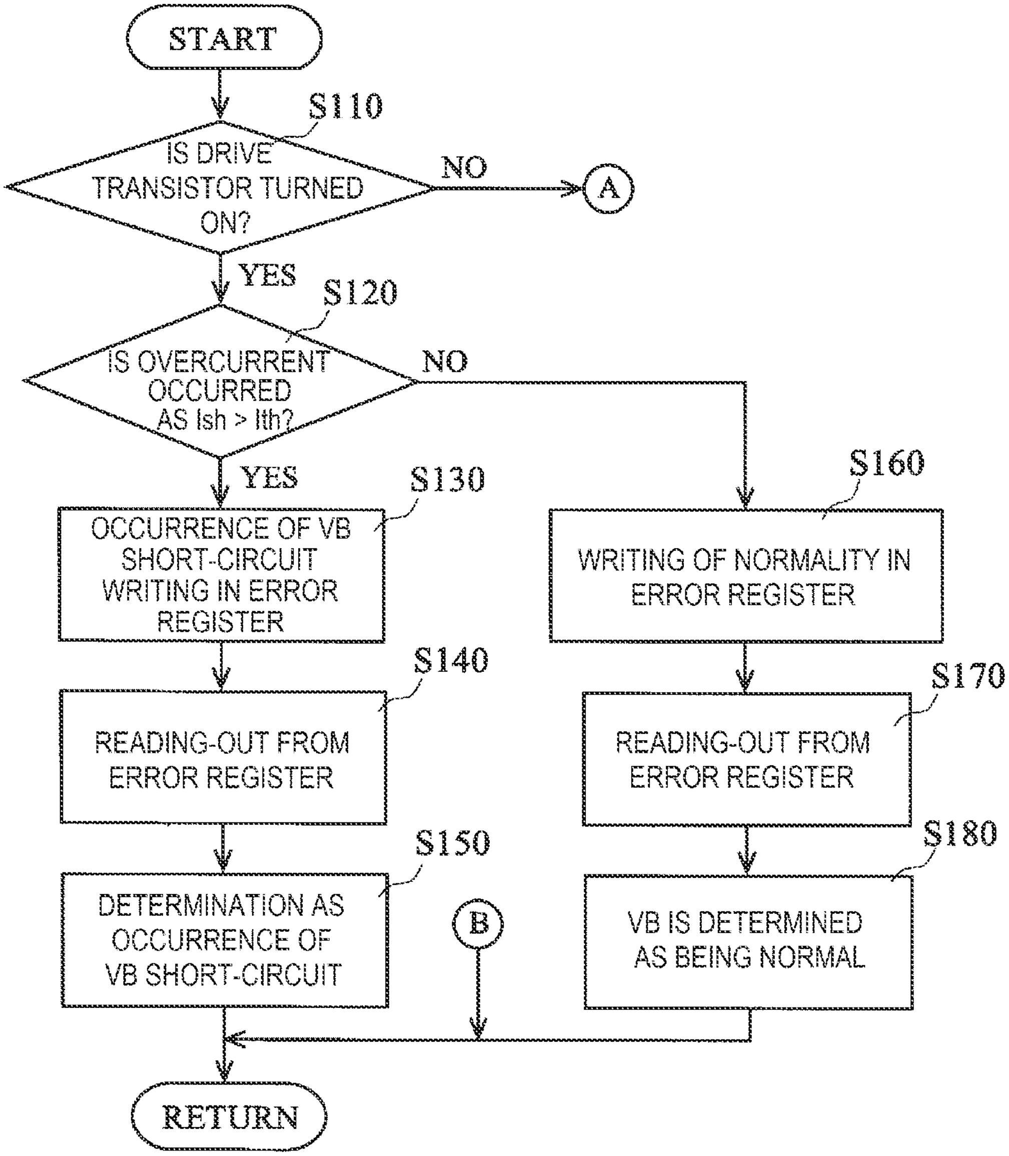

[FIG. 3]
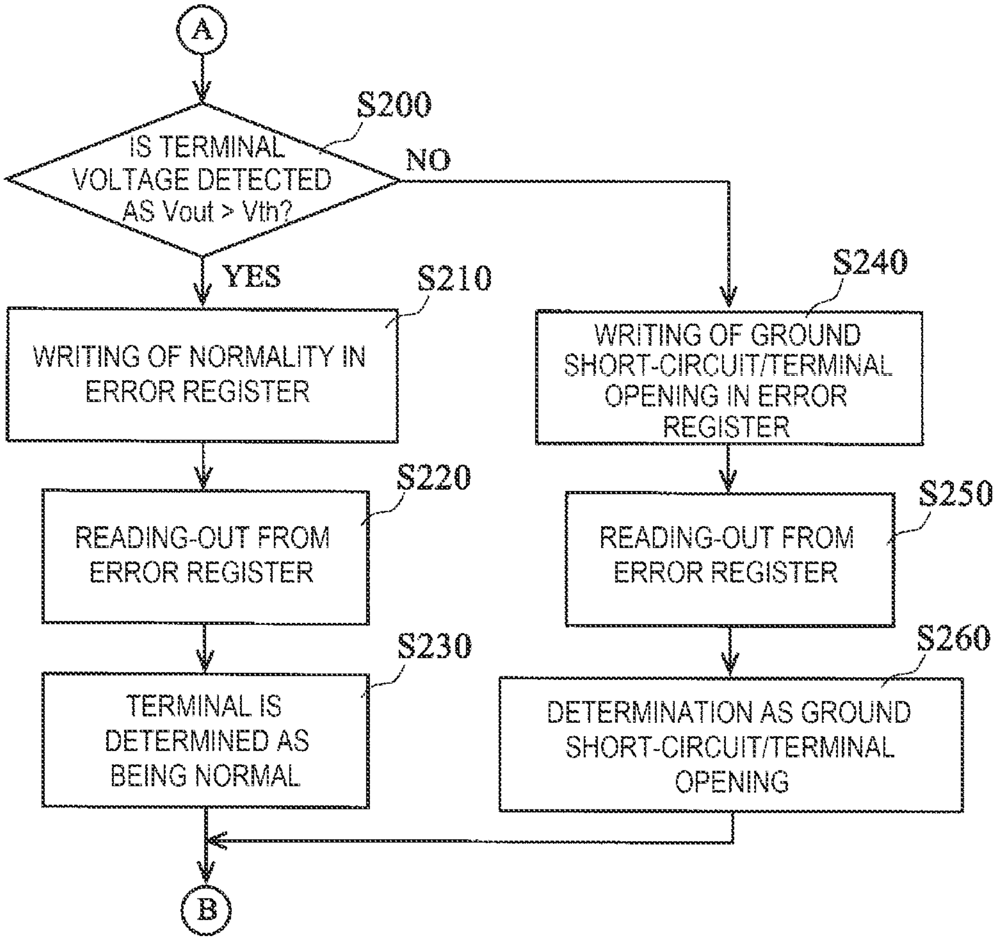

[FIG. 4]
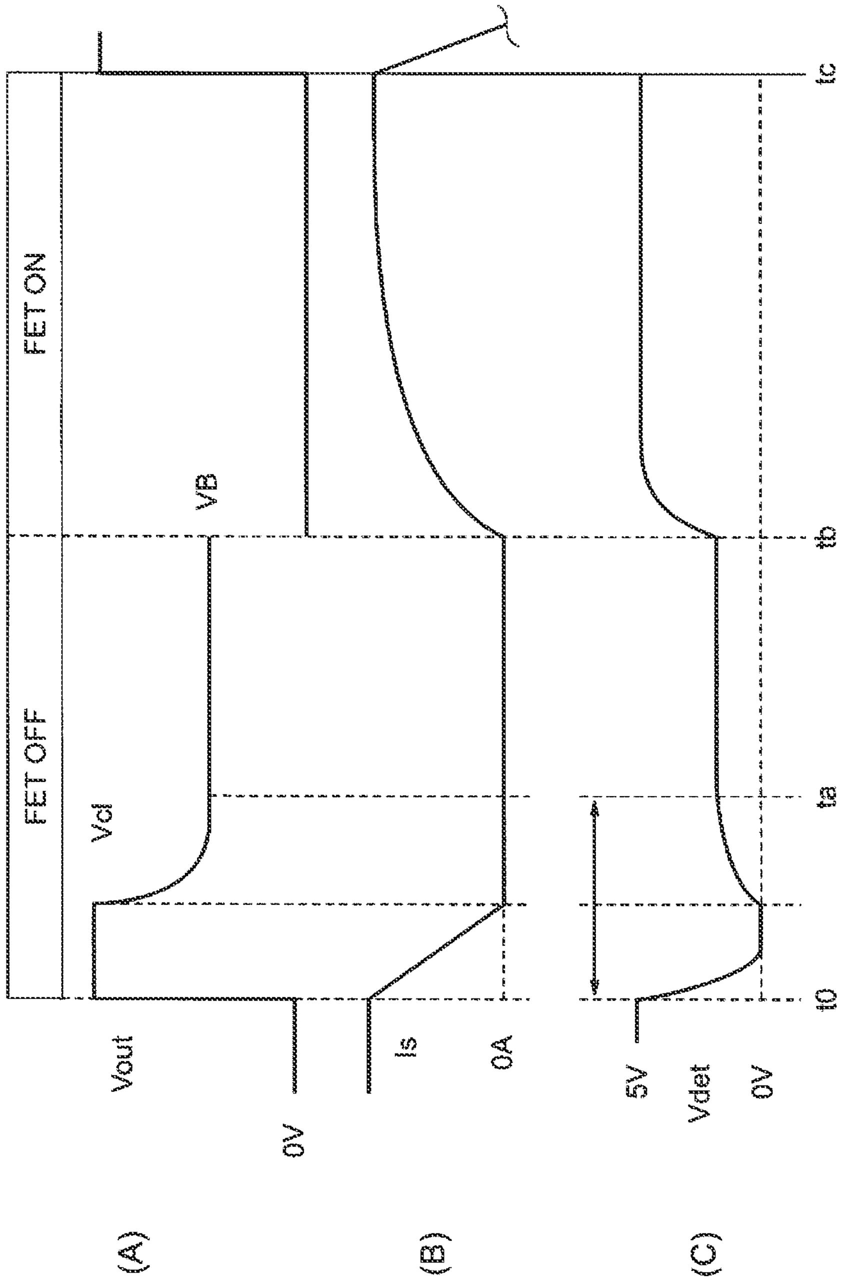

[FIG. 5]

| ECU TERMINAL STATE | FET VOLTAGE STATE | |
|---|---|---|
| | ON | OFF |
| NORMAL | 0V | VB |
| VB SHORT-CIRCUIT | OVERCURRENT | VB |
| GROUND SHORT-CIRCUIT | 0V | 0V |
| TERMINAL OPENING | 0V | 0V |

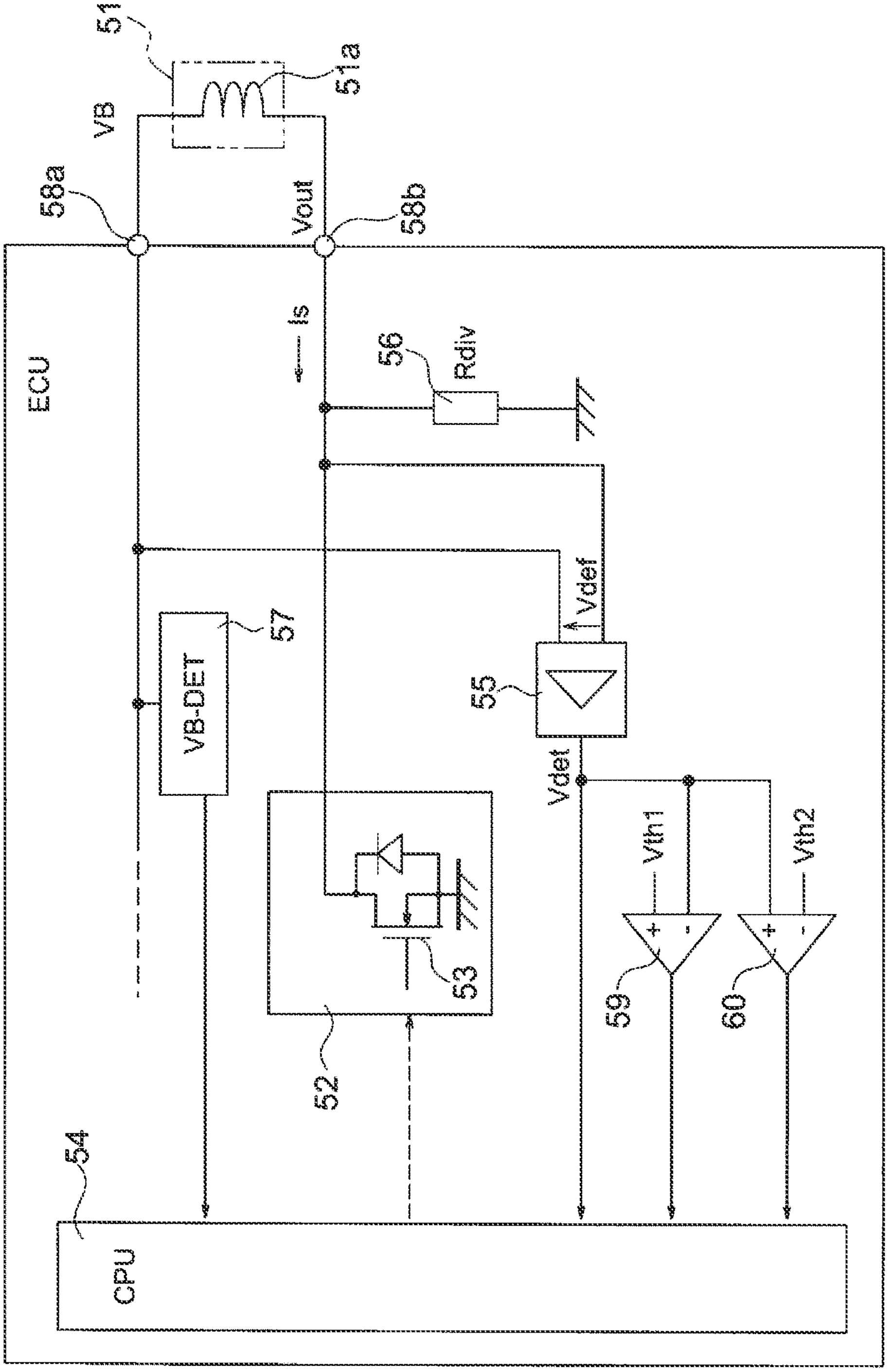
[FIG. 6]

[FIG. 7]
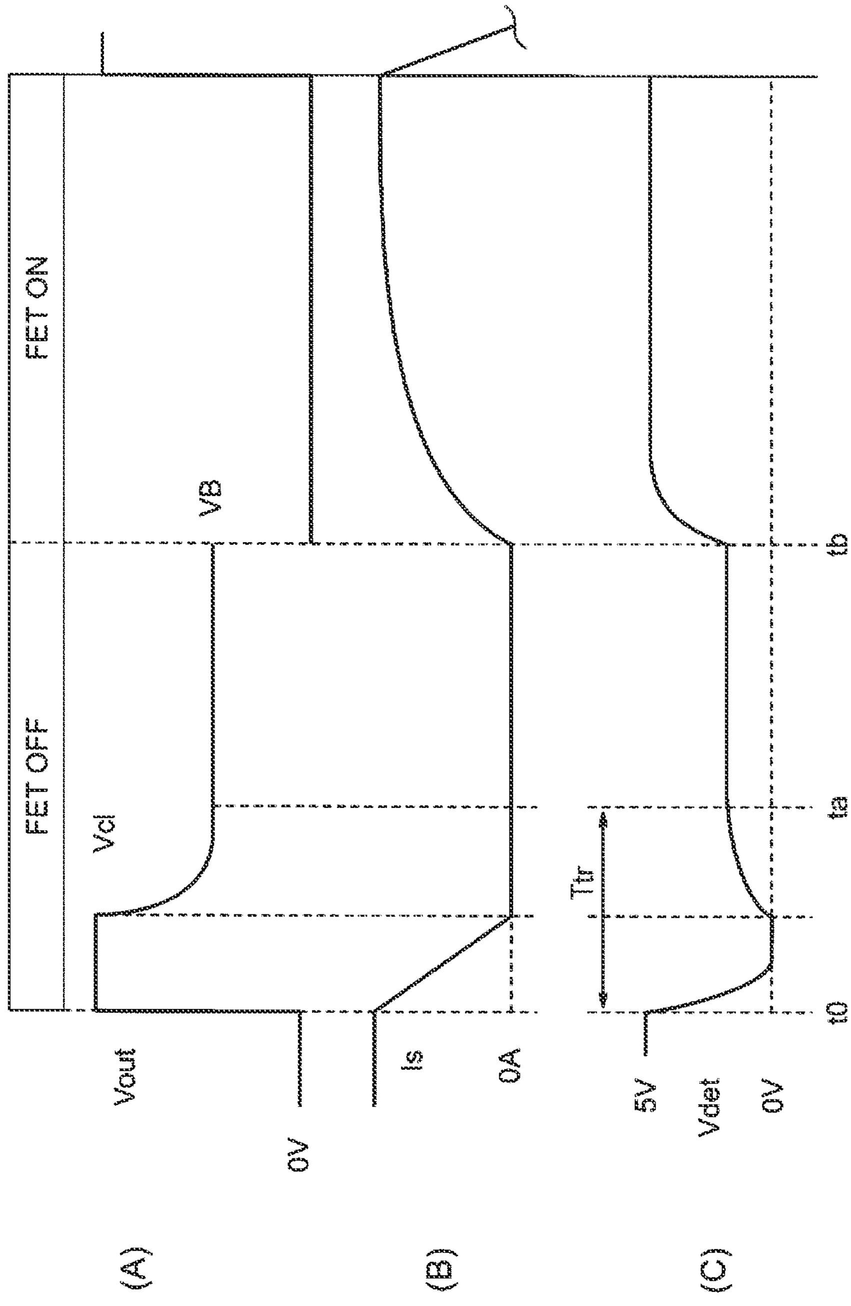

[FIG. 8]
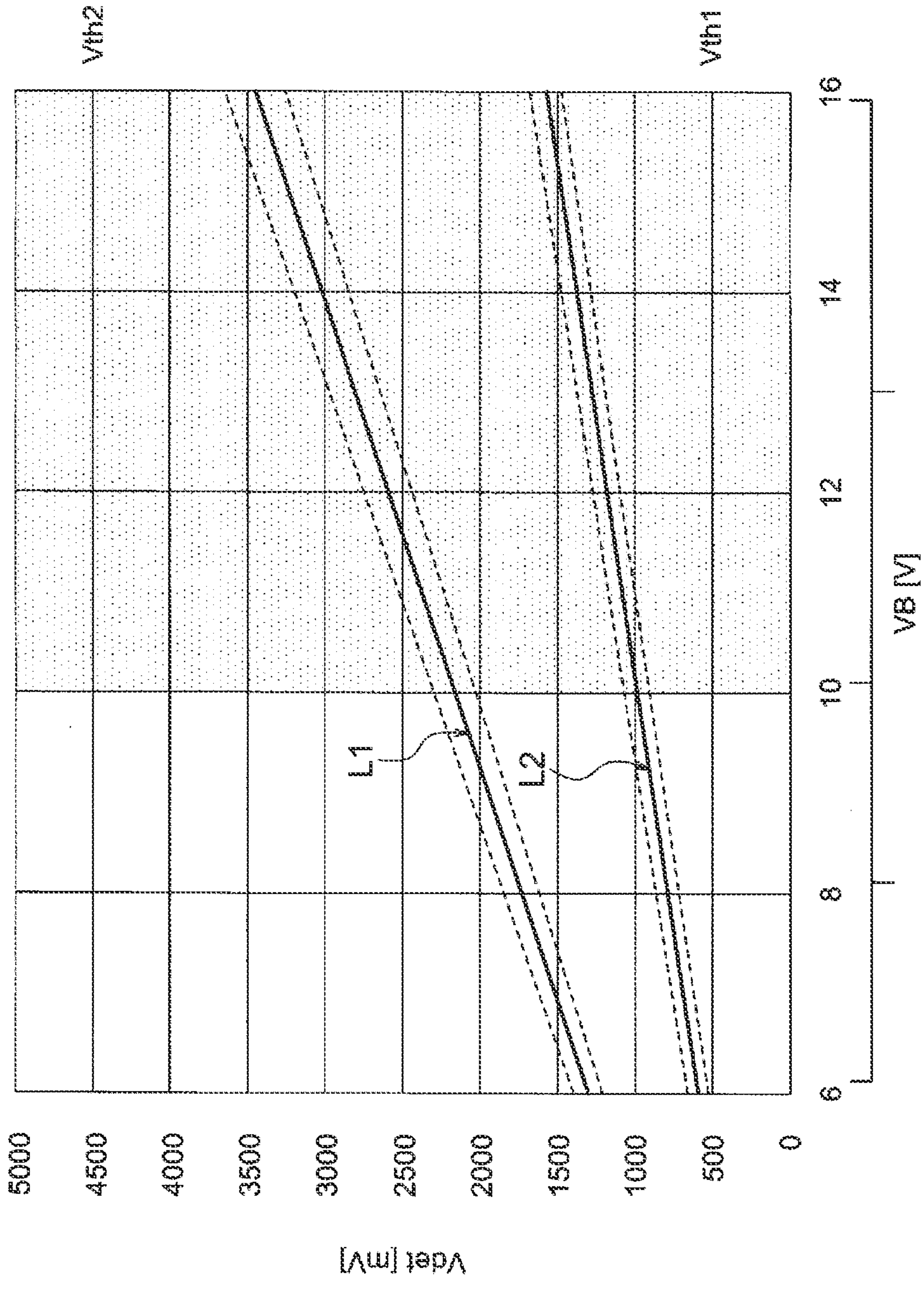

PURGE VALVE DRIVING CONTROL DEVICE

BACKGROUND

The present invention relates to a purge valve driving control device, and particularly, to a purge valve driving control device that improves reliability, stability, and the like of driving control.

Gasoline vehicles are required to be equipped with a fuel evaporative gas emission control device, and it is well known that the fuel evaporative gas emission control device is equipped with a configuration corresponding to a structure of vehicles, or the like.

For example, a configuration in which activated carbon stored in a canister adsorbs a fuel evaporation gas, and a part of engine intake air is caused to pass through the canister and is discharged (purged) to an engine intake system through a purge valve at the time of activating the engine, that is, the part of the engine intake air is caused to flow into an engine intake port to be applied to a fuel of the engine, and the like are relatively well known.

To realize appropriate engine control, it is necessary to grasp the amount of evaporated fuel that is supplied to the engine intake port through the purge valve as accurate as possible.

Therefore, the opening degree of the purge valve is typically controlled with feedback control or the like.

Particularly, in a case of a solenoid type purge valve, the opening degree thereof is determined with the magnitude of an energization current, but a battery voltage and a solenoid resistance value which are main factors which determine the energization current vary depending on an operation state or an ambient temperature of vehicles.

Therefore, as a typically employed configuration, a detection circuit that detects the solenoid resistance value is provided, and a deviation from a target value of the energization current is feedback-corrected while sequentially detecting the resistance value to secure an appropriate energization current, thereby reliably securing a desired opening degree (for example, refer to JP2013-199874A or the like).

On the other hand, in the purge valve driving control device as described above, from the viewpoint of the degree of importance of a device, and the like, it is required to detect an abnormal state such as short-circuit, opening, and the like in a connection terminal with the purge valve.

FIG. 6 illustrates a configuration example of a purge valve driving control device in the related art, and abnormality detection in the device in the related art will be described below with reference to the same drawing.

In the purge valve driving control device that uses an electronic control unit (ECU) for vehicles in the related art, a battery voltage VB is applied to one end of a solenoid 51*a* of a purge valve 51, and the other end of the solenoid 51*a* is connected to a driver circuit 52 constituted by a so-called low-side transistor 53.

The low-side transistor 53 of the driver circuit 52 is turned on or off in correspondence with PWM control by a microcomputer (noted as "CPU" in FIG. 6) 54, and an energization current of the solenoid 51*a* is controlled. Accordingly, the opening degree of a valve can be adjusted.

In addition, in the device in the related art, a resistance detection circuit 55 configured to detect a resistance value of the solenoid 51*a* (hereinafter, referred to as "solenoid resistance value" for convenience of explanation) is provided. A voltage-dividing resistor 56 (noted as "Rdiv" in FIG. 6) is provided between a connection point between the solenoid 51*a* and the low-side transistor 53, and a ground.

The resistance detection circuit 55 amplifies and outputs a differential voltage Vdef that is a difference between the battery voltage VB and a divided voltage Vdiv obtained by the voltage-dividing resistor 56, and outputs the resultant amplified voltage to the microcomputer 54 as a detection voltage Vdet.

In the microcomputer 54, a solenoid resistance value is calculated by operation on the basis of an output voltage of the resistance detection circuit 55, an actual battery voltage VB detected by a battery voltage detection circuit (noted as "VB-DET" in FIG. 6), and a resistance value of the voltage-dividing resistor 56.

Then, the calculated solenoid resistance value is applied for duty correction in the PWM control.

In the device in the related art, in addition to detection of the solenoid resistance value as described above, first and second comparators 59 and 60 are provided to detect presence or absence of abnormality in first and second connection terminals 58*a* and 58*b* to which the solenoid 51*a* is connected.

That is, the output voltage of the resistance detection circuit 55 is compared with threshold values Vth1 and Vth2 in the first and second comparators 59 and 60, and presence or absence of abnormality is determined in the microcomputer 54 in accordance with comparison results.

For example, for some reason, when a supply line of the battery voltage VB enters a state of being directly connected to an output of the driver circuit 52, that is, in other words, when it enters a state equivalent to that the first connection terminal 58*a* and the second connection terminal 58*b* are electrically and directly connected to each other (hereinafter, referred to as "battery short-circuit" for convenience of explanation), the differential voltage Vdef becomes approximately 0 V, and the detection voltage Vdet of the resistance detection circuit 55 also becomes approximately 0 V.

In this case, in the first comparator 59, the output voltage of the resistance detection circuit 55 falls below the first threshold value Vth1, and as a result, in the microcomputer 54, it is determined that battery short-circuit occurs.

On the other hand, in a case where terminal opening in which connection between the driver circuit 52 and the solenoid 51*a* is cut off, or a state in which an output stage of the driver circuit 52 is directly connected to the ground, that is, in order words, ground short-circuit in which the second connection terminal 58*b* is connected to the ground occurs, the differential voltage Vdef becomes approximately near the battery voltage VB in any case.

In this case, in the second comparator 60, the output voltage of the resistance detection circuit 55 is above the second threshold value Vth2, and as a result, in the microcomputer 54, it is determined that terminal opening or ground short-circuit occurs.

However, in the configuration with which the detection voltage Vdet of the resistance detection circuit 55 is used for abnormality detection as in the related art, there is a problem that detection timing of abnormality detection is limited due to electrical characteristics of a solenoid, or deterioration in resolution or accuracy in solenoid resistance value detection is caused.

First, FIG. 7 schematically illustrates a waveform diagram of a main part in energization control of the solenoid 51*a*, and detection timing of abnormality detection will be described below with reference to the same drawing.

Since the energization control of the solenoid 51*a* of the purge valve 51 is typically performed by so-called PWM control, the low-side transistor 53 is turned on or off with a predetermined duty ratio by the microcomputer 54.

At the time of energization of the solenoid 51*a*, when the low-side transistor 53 is turned on, a voltage Vout in the second connection terminal 58*b* drops to a voltage near 0 V, and an energization current Is gradually increases (refer to FIG. 7(A) and FIG. 7(B)).

In addition, the detection voltage Vdet of the resistance detection circuit 55 rises in accordance with an increase in the energization current Is, and then becomes a constant voltage (refer to FIG. 7(C)).

After a predetermined energization time, the low-side transistor 53 is turned off by the microcomputer 54, but due to inductance of the solenoid 51*a*, the voltage Vout in the second connection terminal 58*b* temporarily rapidly rises and reaches a predetermined clamp voltage Vcl, and then gradually drops with the passage of time and becomes a predetermined battery voltage VB (refer to FIG. 7(A)).

Due to an influence of the inductance, the energization current Is does not immediately become zero when the low-side transistor 53 is turned off, and decreases with the passage of time (refer to FIG. 7(B)).

In addition, the output voltage Vdet of the resistance detection circuit 55 temporarily reaches a maximum output (5 V in this example) due to an influence of the inductance when the low-side transistor 53 is turned off, and then drops temporarily to 0 V in combination with a reduction in the inductance. Then, an output state returns to a normal state (refer to FIG. 7(C)). Note that, in FIG. 7(C), a period indicated by Ttr is a period for which a transient response due to inductance occurs, and after passage of the period, the output state of the resistance detection circuit 55 enters a normally returned state.

After all, detection of the solenoid resistance value, and abnormality detection such as battery short-circuit by the resistance detection circuit 55 is limited to a period up to time tb at which the low-side transistor 53 is turned on again after passage of the above-described transient response period Ttr, that is, after time ta.

Next, deterioration of resolution or accuracy in the solenoid resistance value detection will be described with reference to FIG. 8.

In FIG. 8, a variation characteristic example of the output voltage Vdet of the resistance detection circuit 55 with respect to a variation of the battery voltage VB in a case where the solenoid resistance value is 38.5Ω is illustrated by a solid characteristic line attached with a symbol L1 (hereinafter, referred to as "characteristic line L1" for convenience of explanation). Note that, dotted-lines on upper and lower sides of the characteristic line L1 illustrate an example of a fluctuation range. Note that, FIG. 8 is an example in a case where a maximum output voltage of the resistance detection circuit 55 is 5 V.

In addition, a variation characteristic example of the output voltage Vdet of the resistance detection circuit 55 with respect to a variation of the battery voltage VB in a case where the solenoid resistance value is 17 (2 is illustrated by a solid characteristic line attached with a symbol L2 (hereinafter, referred to as "characteristic line L2" for convenience of explanation).

Note that, dotted-lines on upper and lower sides of the characteristic line L2 illustrate an example of a fluctuation range.

Furthermore, in this example, a case where the threshold value Vth1 of the first comparator 59 is 500 mV and the threshold value Vth2 of the second comparator 60 is 4500 m V is assumed.

Accordingly, in this case, the output voltage Vdet of the resistance detection circuit 55 which can be used for detection of the solenoid resistance value in the microcomputer 54 is limited to a range of 500 mV<Vdet<4500 mV.

The above-described characteristic lines L1 and L2 are results obtained by adjusting a circuit constant and the like of the resistance detection circuit 55 in consideration of the limited range of the output voltage Vdet.

In order to secure higher resolution and accuracy in solenoid resistance value detection, for example, it is necessary to secure an inclination of the characteristic lines L1 and L2, that is, a variation of the output voltage Vdet with respect to a variation of the battery voltage VB as large as possible.

Accordingly, the limitation of the output voltage Vdet as described above naturally limits the resolution and the accuracy of the solenoid resistance value detection.

For example, with regard to the characteristic line L1 shown in FIG. 8, it is assumed that the circuit constant and the like are adjusted so that the output voltage Vdet on an upper end side of the characteristic line L1, that is, in the vicinity of the battery voltage VB of 16 V becomes near 5 V, and the inclination of the characteristic line is enlarged to secure higher resolution and accuracy of the solenoid resistance value detection.

In this case, even though the resolution and accuracy of the solenoid resistance value detection in the vicinity of the central portion of the characteristic line L1, that is, in a portion where the battery voltage is near approximately 10 V to 14 V (shaded portion in FIG. 8) can be improved, in a portion on an upper end side of the characteristic line L1, a range that overlaps the vicinity of the previous threshold value Vth2 is superimposed on an abnormality determination range. Therefore, the overlapping portion must be excluded from both the abnormality determination and the solenoid resistance value detection. That is, the improvement in resolution and accuracy of the solenoid resistance value detection is limited to a partial range, and thus there is a problem that it is difficult to improve the resolution and the accuracy without unevenness in a desired range.

SUMMARY

The invention has been made in consideration of the above-described circumstances, and an object thereof is to provide a purge valve driving control device capable of detecting abnormality with a circuit configuration utilizing an existing circuit as much as possible while securing resolution and accuracy of solenoid resistance value detection.

To accomplish the object of the invention, a purge valve driving control device according to the invention is a purge valve driving control device, including:

a driver circuit configured to perform energization to a solenoid of a solenoid type purge valve; and a microcomputer configured to be able to control a valve opening degree of the solenoid type purge valve through the driver circuit, wherein a battery voltage is applied to one end of the solenoid through a first connection terminal provided in the purge valve driving control device, and the other end of the solenoid is connected to a second connection terminal provided in the purge valve driving control device, in the driver circuit, a drive transistor as a low-side transistor and a shunt resistor are provided between the second connection terminal and a ground and are connected in series in the order of the drive transistor and the shunt resistor from a side of the second connection terminal, an overcurrent detection circuit configured to be able to detect occurrence of an overcurrent in the drive transistor on the basis of a voltage of the shunt resistor is provided, and the microcomputer is configured to be able to determine presence or absence of occurrence of battery short-circuit equivalent to an electrical short-circuit state of the first connection terminal and the second connection terminal on the basis of an output of the overcurrent detection circuit.

According to the invention, since battery short-circuit in which a potential of a connection point between the drive transistor and the solenoid becomes the battery voltage can be detected on the basis of a current flowing through the drive transistor by using the drive transistor, a configuration using an existing circuit can be employed, and since a circuit configuration is made to be separate from a solenoid resistance value detection circuit differently from a circuit in the related art, stable solenoid resistance value detection can be secured without deterioration in resolution and accuracy of solenoid resistance value detection.

Furthermore, since the comparator is provided to compare the voltage of the connection point between the drive transistor and the solenoid, and the reference voltage, ground short-circuit in which the connection point enters a short-circuit state with the ground, or terminal opening in which connection between the drive transistor and the solenoid is cut off can be detected, and it is possible to obtain an effect capable of detecting abnormality of a circuit while securing stable solenoid resistance value detection without deterioration in resolution and accuracy of the solenoid resistance value detection as in battery short-circuit.

BRIEF DESCRIPTION OF DRAWINGS

FIG. 1 is a configuration diagram illustrating a configuration example of a purge valve driving control device according to an embodiment of the invention.

FIG. 2 is a flowchart illustrating a procedure of detecting battery short-circuit by abnormality detection processing in the purge valve driving control device according to the embodiment of the invention.

FIG. 3 is a flowchart illustrating a procedure of detecting ground short-circuit/terminal opening by abnormality detection processing in a purge valve driving control device according to the embodiment of the invention.

FIG. 4 is a waveform diagram schematically illustrating a signal variation of main parts for explaining a driving state of a purge valve and abnormality detection timing by the purge valve driving control device according to the embodiment of the invention, FIG. 4(A) is a waveform diagram schematically illustrating a variation of a voltage Vout of a second connection terminal, FIG. 4(B) is a waveform diagram schematically illustrating a variation of a current Is flowing through the second connection terminal, and FIG. 4(C) is a waveform diagram schematically illustrating a variation of an output voltage Vdet of a resistance detection voltage amplifier.

FIG. 5 is a schematic view explaining a relationship between On and Off of a drive transistor of a valve drive circuit provided in the purge valve driving control device and an abnormality detection operation according to the embodiment of the invention.

FIG. 6 is a configuration diagram illustrating a configuration example of a device in the related art.

FIG. 7 is a waveform diagram schematically illustrating a signal variation of main parts for explaining a drive state of a purge valve and abnormality detection timing by a device in the related art, FIG. 7(A) is a waveform diagram schematically illustrating a variation of a voltage Vout of a second connection terminal, FIG. 7(B) is a waveform diagram schematically illustrating a variation of an energization current Is of a solenoid, and FIG. 7(C) is a waveform diagram schematically illustrating a variation of a detection voltage of a resistance detection circuit.

FIG. 8 is a characteristic diagram illustrating a correlation between a battery voltage and an output voltage of a resistance value detection circuit in detection of a solenoid resistance value by the device in the related art.

DETAILED DESCRIPTION

Hereinafter, an embodiment of the invention will be described with reference to FIG. 1 to FIG. 5.

Note that, members, arrangements, and the like to be described below are not intended to limit the invention, and can be modified in various manners within a range of the gist of the invention.

First, a configuration example of a purge valve driving control device according to the embodiment of the invention will be described with reference to FIG. 1.

The purge valve driving control device according to the embodiment of the invention is configured to execute driving control of a solenoid type purge valve 1 and abnormality detection (details thereof will be described later) with focus given to an electronic control unit (noted as "ECU" in FIG. 1) 100 for vehicles which is mounted to a vehicle.

The electronic control unit 100 for vehicles according to the embodiment of the invention includes a microcomputer (noted as "CPU" in FIG. 1) 110, a driver circuit (noted as "DRV" in FIG. 1) 120, a resistance detection voltage amplifier 130, a battery voltage detection circuit (noted as "VB-DET" in FIG. 1) 140, and a voltage-dividing resistor (noted as "Rdiv" in FIG. 1) 2 as main constituent elements.

The microcomputer 110 includes a storage element (not illustrated) such as a RAM and a ROM, an analog to digital converter (not illustrated), an interface circuit, and the like, and has a known/well-known configuration.

The microcomputer 110 according to the embodiment of the invention is configured to be able to execute various kinds of control processing such as solenoid resistance value detection, purge valve driving control, and abnormality detection as will be described later.

The electronic control unit 100 for vehicles according to the embodiment of the invention is provided with first and second connection terminals 3*a* and 3*b* for connection with the purge valve 1 provided on an outside.

It is noted that, a battery voltage VB is applied to the first connection terminal 3*a*, and one end of a solenoid 1*a* of the purge valve 1 is connected to the first connection terminal 3*a*.

Furthermore, the other end of the solenoid 1*a* is connected to the second connection terminal 3*b*, the second connection terminal 3*b* is connected to an output stage of the driver circuit 120, and the solenoid 1*a* is energized and controlled by the driver circuit 120 as to be described later.

The resistance detection voltage amplifier 130 amplifies and outputs a voltage necessary for operational calculation of a solenoid resistance value that is a resistance value of the solenoid 1*a* in the microcomputer 110. The resistance detection voltage amplifier 130 has a configuration of a well known amplification circuit.

One input stage of the resistance detection voltage amplifier 130 is connected to the first connection terminal 3*a*, and the battery voltage VB is input to the input stage.

In addition, the other input stage of the resistance detection voltage amplifier 130 is connected to the second connection terminal 3*b*, and the voltage-dividing resistor 2 is connected between the second connection terminal 3*b* and a ground.

Accordingly, a voltage corresponding to voltage drop in the voltage-dividing resistor 2 is applied to the other input stage of the resistance detection voltage amplifier 130.

Here, when the voltage in the second connection terminal 3*b* is set as a drive output voltage Vout, the input voltage of the resistance detection voltage amplifier 130 is set as a differential voltage Vdef, the degree of amplification of the resistance detection voltage amplifier 130 is set as a, the battery voltage is set as VB, and the output voltage of the resistance detection voltage amplifier 130 is set as a detection voltage Vdet, the detection voltage Vdet that is input to the microcomputer 110 is expressed by the following Expression 1.

$$Vdet = \alpha \times Vdef = \alpha \times (Vb - Vout) \quad \text{Expression 1}$$

On the other hand, when the solenoid resistance value of the solenoid 1*a* is set as Rva, and a resistance value of the voltage-dividing resistor 2 is set as Rdiv, a relationship expressed by the following Expression 2 is established between the two resistance values, the drive output voltage Vout, and the differential voltage Vdef.

$$Vdef/Vout = Rva/Rdiv \quad \text{Expression 2}$$

In addition, Vout is expressed by the following Expression 3.

$$Vout = VB \times Rdiv/(Rva + Rdiv) \quad \text{Expression 3}$$

In addition, in the microcomputer 110, the solenoid resistance value Rva is calculated on the basis of the following Expression 4.

$$Rva = (Vdet \times Rdiv)/(\alpha \times VB - Vdet) \quad \text{Expression 4}$$

In addition, the solenoid resistance value calculated as described above is applied to PWM control of a drive transistor 4 provided in the driver circuit 120 to be described later by the microcomputer 110.

The battery voltage detection circuit 140 is configured to convert the battery voltage VB to a voltage suitable for the microcomputer 110 and outputs the voltage.

In the microcomputer 110, monitoring processing as to whether the battery voltage VB is correct is executed. In addition, a value of the battery voltage VB obtained by the battery voltage detection circuit 140 is applied to calculation of the above-described solenoid resistance value or the like.

The driver circuit 120 includes the drive transistor 4, a shunt resistor (noted as "Rs" in FIG. 1) 5, an overcurrent detection circuit (noted as "I-DET" in FIG. 1) 11, a comparator 12, and an error register (noted as "F-REG" in FIG. 1) 13 as main constituent elements.

The driver circuit 120 according to the embodiment of the invention performs energization control of the solenoid 1*a* as in the related art, and is configured to be able to detect abnormality in combination with the microcomputer 110 as to be described later in detail.

Here, in the embodiment of the invention, abnormal detection represents detection of an abnormal state of a voltage and a current in the first and second connection terminals 3*a* and 3*b*.

Specifically, the abnormal state in the embodiment of the invention is largely classified into two states including "battery short-circuit" and "ground short-circuit/terminal opening" as to be described below.

The "battery short-circuit" represents a state equivalent to electrical short-circuit of the first connection terminal 3*a* and the second connection terminal 3*b*. That is, the "battery short-circuit" represents a state that, in other words, the battery voltage VB is applied directly to the second connection terminal 3*b*.

Next, the "ground short-circuit/terminal opening" is a general term of ground short-circuit and terminal opening. In the embodiment of the invention, determination as to which of the ground short-circuit or the terminal opening occurs is not performed, and determination whether any one of the ground short-circuit and the terminal opening occurs is performed (details will be described later).

Note that, the "ground short-circuit" represents a state in which the second connection terminal 3*b* is connected to the ground, and the "terminal opening" represents a state in which connection between the second connection terminal 3*b* and the solenoid 1*a* is cut off, that is, a state in which a drain of the drive transistor 4 to be described later is open.

Next, a specific configuration of the driver circuit 120 will be described.

First, the drive transistor 4 is PWM-controlled in correspondence with a valve driving control signal Svc input from the microcomputer 110 to control energization of the solenoid 1*a* of the purge valve 1.

The PWM-control on the drive transistor 4 by the microcomputer 110 is basically similar as in the related art, and is briefly explained below.

In the microcomputer 110, a duty ratio in the PWM-control on the drive transistor 4 is set in correspondence with a desired valve opening degree of the purge valve 1, that is, in other words, an operation state of a vehicle, and driving of the drive transistor 4 is performed with the duty ratio.

However, since the solenoid resistance value fluctuates depending on a fluctuation of a battery voltage or a temperature variation, a desired valve opening degree is not obtained with the duty ratio set as described above. Therefore, in the microcomputer 110, the PWM-control on the drive transistor 4 by feedback control is executed while performing correction of the duty ratio on the basis of the solenoid resistance value calculated as described above.

The drive transistor 4 according to the embodiment of the invention functions as a so-called low-side transistor.

Specifically, in the embodiment of the invention, a metal-oxide-semiconductor-field-effect-transistor (MOSFET) is used as the drive transistor 4. The drain of the drive transistor 4 is connected to one end of the solenoid 1*a* of the purge valve 1 through the second connection terminal 3*b*.

The battery voltage VB is applied to the other end of the solenoid 1*a* through the first connection terminal 3*a* provided in the electronic control unit 100 for vehicles.

In addition, the shunt resistor 5 is provided between a source of the drive transistor 4 and the ground.

The above-described valve driving control signal Svc is input to a gate of the drive transistor 4, the drive transistor 4 is subjected to the PWM-control by the microcomputer 110 as described above, and energization current control on the solenoid 1*a* by the drive transistor 4 is performed.

The overcurrent detection circuit 11 performs detection of an overcurrent flowing through the drive transistor 4 due to occurrence of the "battery short-circuit".

It is noted that, first, a voltage of the shunt resistor 5 (hereinafter, referred to as "shunt voltage" for convenience of explanation) is input to an input stage of the overcurrent detection circuit 11.

When a current flowing through the shunt resistor 5 becomes an overcurrent due to the "battery short-circuit", a shunt voltage exceeds a predetermined overcurrent reference voltage set in the overcurrent detection circuit 11. The overcurrent detection circuit 11 is configured to output a predetermined overcurrent detection voltage when the shunt voltage exceeds the predetermined overcurrent reference voltage on the assumption that a shunt current Ish exceeds a predetermined reference overcurrent Ith. Note that, the overcurrent detection circuit 11 is not unique to the invention, and has a well-known circuit configuration in the related art.

The comparator 12 is configured to detect occurrence of the ground short-circuit/terminal opening.

A non-inverting input terminal of the comparator 12 is connected to the second connection terminal 3*b*, and a predetermined determination reference voltage Vth is applied to an inverting input terminal.

In a state in which the "battery short-circuit" or the "ground short-circuit/terminal opening" does not occur and the driver circuit 120 normally operates, a voltage exceeding a predetermined determination reference voltage Vth corresponding to an operation state of the drive transistor 4 is applied to the non-inverting input terminal of the comparator 12.

In this case, the comparator 12 outputs a predetermined positive voltage corresponding to a logic value "1".

On the other hand, in a state in which the "ground short-circuit" in which the second connection terminal 3*b* is connected to the ground or the "terminal opening" in which connection between the second connection terminal 3*b* and the solenoid 1*a* is cut off and the second connection terminal 3*b* is in an opened state occurs, a voltage of the non-inverting input terminal of the comparator 12 becomes approximately near a ground potential in any case, and is lower than the above-described determination reference voltage Vth.

As a result, the comparator 12 outputs a voltage corresponding to a logic value "0", that is, 0 V or a predetermined negative voltage.

The error register 13 is a register that temporarily stores presence or absence of detection of the "battery short-circuit" by the overcurrent detection circuit 11, and presence or absence of detection of the "ground short-circuit/terminal opening" by the comparator 12.

For example, the error register 13 is classified into a register region for temporarily writing and storing presence or absence of detection of the "battery short-circuit" (hereinafter, referred to as "battery short-circuit register region" for convenience of explanation), and a register region for temporarily writing and storing presence or absence of detection of the "ground short-circuit/terminal opening" (hereinafter, referred to as "ground short-circuit/terminal opening register region" for convenience of explanation) (not illustrated).

As described above, when the "battery short-circuit" occurs, and a predetermined overcurrent detection voltage (for example, 5 V) is output from the overcurrent detection circuit 11, a logic value "1" is written in the battery short-circuit register region, which is stored and retained until the output voltage of the overcurrent detection circuit 11 is reset to 0.

On the other hand, when the "ground short-circuit/terminal opening" occurs, and the output voltage of the comparator 12 varies to a voltage corresponding to a logic value "0" from a voltage corresponding to a logic value "1", a logic value "1" representing occurrence of the "ground short-circuit/terminal opening" is written in the ground short-circuit/terminal opening register region, which is stored and retained until the output voltage of the comparator 12 is returned to a predetermined positive voltage.

In addition, the logic value data written in the error register 13 as described above is applied to abnormality determination processing in the microcomputer 110 as to be described later.

Note that, here, the "logic value data" is a general term of a logic value "1" and a logic value "0".

Next, abnormality detection processing operation in the purge valve driving control device according to the embodiment of the invention will be described with reference to flowcharts shown in FIG. 2 and FIG. 3, and waveform diagrams shown in FIG. 4.

First, when processing by the microcomputer 110 is initiated, determination as to whether "a drive transistor is turned on", that is, as to whether the drive transistor 4 is in an On-state (drive state) (refer to step S110 in FIG. 2).

In step S110, in a case where it is determined that the drive transistor 4 is in the On-state (case of YES), battery short-circuit detection is performed as to be described later. In addition, in step S110, in a case where it is determined that the drive transistor 4 is not in the On-state (case of NO), ground short-circuit/terminal opening detection is performed as to be described later.

Step S120 to step S150 illustrate a flow of entire operations of the present device until an overcurrent due to the battery short-circuit is detected by the overcurrent detection circuit 11, and it is determined that the battery short-circuit occurs by the microcomputer 110.

In addition, step S120, and step S160 to step S180 illustrate, in the same manner, a flow of entire operations of the present device until the overcurrent due to the battery short-circuit is not detected by the overcurrent detection circuit 11 and it is determined that battery voltage is normal by the microcomputer 110.

First, in the overcurrent detection circuit 11, determination is made as to "occurrence of an overcurrent" due to the battery short-circuit, that is, as to whether it is in a state satisfying a relationship of "Ish>Ith" (refer to step S120 in FIG. 2).

In the overcurrent detection circuit 11, when the shunt voltage exceeds a predetermined overcurrent reference voltage, it is determined that the overcurrent occurs, that is, the shunt current Ish exceeds a predetermined reference overcurrent Ith (case of YES), a predetermined overcurrent detection voltage is output.

Note that, the overcurrent detection circuit 11 does not operate only at timing in step S120, and is always in an operation state capable of detecting presence or absence of occurrence of the above-described overcurrent after supply of a power supply voltage is initiated in accordance with activation of the purge valve driving control device.

The respective steps in FIG. 2 are merely for explaining, as a matter of convenience, an overall flow of the abnormality determination processing by the microcomputer 110, the overcurrent detection circuit 11, the comparator 12, and the error register 13, and are not intended to limit timing of a circuit operation.

In addition, when a predetermined overcurrent detection voltage is output from the overcurrent detection circuit 11, "occurrence of VB short-circuit/writing in an error register" is performed (refer to step S130 in FIG. 2). Here, the "occurrence of VB short-circuit" represents occurrence of the battery short-circuit.

That is, in correspondence with output of the predetermined overcurrent detection voltage from the overcurrent detection circuit 11, in the error register 13, a logic value "1" representing occurrence of the battery short-circuit is written in the above-described battery short-circuit register region.

On the other hand, in the microcomputer 110, "reading-out from error register" is performed (refer to step S140 in FIG. 2).

It is noted that, in the microcomputer 110, reading-out of logic value data in the battery short-circuit register region of the error register 13 is performed repeatedly at timing determined in advance.

In the purge valve driving control device according to the embodiment of the invention, in a case where the drive transistor 4 is in an On-state, only the battery short-circuit can be detected as abnormality, and thus a target region of reading-out of the logic value data of the error register 13 by the microcomputer 110 is only the battery short-circuit register region.

In the microcomputer 110, when the logic value data read out from the battery short-circuit register region of the error register 13 is determined as "1", "determination is made as occurrence of VB short-circuit", that is, determination is made as a state in which the battery short-circuit occurs (refer to step S150 in FIG. 2). After the determination in step S150 is made, the process returns to a main routine (not illustrated), and after another required processing is executed, the above-described operation is reinitiated from the beginning.

Note that, in a case where determination is made as occurrence of the battery short-circuit, typically, abnormality coping processing including alarm processing such as lighting of warning lights and sounding of alarms, compulsory stoppage of a device operation, and the like are executed, but specific processing contents thereof are determined individually in correspondence with specifications of a vehicle, and thus there is no limitation to specific processing contents.

On the other hand, in the overcurrent detection circuit 11, in a case where the shunt voltage does not exceed the predetermined overcurrent reference voltage (case of NO), with regard to the output of the overcurrent detection circuit 11, a predetermined voltage (for example, 0 V) determined in advance, which corresponds to non-occurrence of the battery short-circuit, is output.

According to this, in the error register 13, "writing of normality in error register" is performed (refer to step S160 in FIG. 2).

That is, a logic value "0" corresponding to a normal state in which the battery short-circuit does not occur is written in the battery short-circuit register region of the error register 13.

On the other hand, in the microcomputer 110, "reading-out from the error register" is performed (refer to step S170 in FIG. 2).

That is, the microcomputer 110 performs reading-out of the logic value data in the battery short-circuit register region of the error register 13.

In the microcomputer 110, when it is determined that the logic value data read out from the battery short-circuit register region of the error register 13 is a logic value "0", "VB is determined as being normal", that is, determination is made as a normal state in which the battery short-circuit does not occur (refer to step S180 in FIG. 2).

Next, the process returns to the main routine (not illustrated), and after another required processing is executed, the above-described operation with focus given to the microcomputer 110 is reinitiated from the beginning.

On the other hand, in the determination as to whether "the drive transistor is turned on" by the microcomputer 110 (refer to step S110 in FIG. 2), in a case where it is determined that the drive transistor 4 is not turned on (case of NO), detection of ground short-circuit/terminal opening is executed by the microcomputer 110 on the basis of the operation of the comparator 12 and the error register 13 as to be described later.

Hereinafter, specifically, first, in the comparator 12, determination is made as to whether "a terminal voltage is detected", that is, determination is made as to whether a relationship of "Vout>Vth" is satisfied (refer to step S200 in FIG. 3).

The second connection terminal 3*b* is connected to the non-inverting input terminal of the comparator 12 as described above, the output voltage Vout in the second connection terminal 3*b* is applied to the non-inverting input terminal of the comparator 12, and comparison with the determination reference voltage Vth set to the inverting input terminal is performed.

In a state in which the ground short-circuit/terminal opening does not occur, since the relationship of Vout>Vth is satisfied, the comparator 12 enters an output state of a predetermined voltage (for example, 5 V) corresponding to a logic value High (case of YES in FIG. 3).

In a case where the output of the comparator 12 becomes the predetermined voltage corresponding to the logic value High, "writing of normality in the error register" is performed in the error register 13 (refer to step S210 in FIG. 3).

That is, a logic value "0" corresponding to normality of the output voltage Vout in the second connection terminal 3*b* is written in the ground short-circuit/terminal opening register region of the error register 13.

Note that, the comparator 12 also does not operate only at timing in step S200, and is always in an operation state after supply of the power supply voltage is initiated in accordance with activation of the present device as in the above-described overcurrent detection circuit 11.

On the other hand, in the microcomputer 110, "reading-out from error register" is performed (refer to step S220 in FIG. 3).

That is, in the microcomputer 110, reading-out of the logic value data from the ground short-circuit/terminal opening register region of the error register 13 is performed.

The microcomputer 110 reads out a logic value "0" as the logic value data from the ground short-circuit/terminal opening register region of the error register 13.

Next, in the microcomputer 110, since the logic value "0" is read out from the ground short-circuit/terminal opening register region, "terminal is determined as being normal", that is, it is determined that the first and second connection terminals 3*a* and 3*b* are in an electrically normal state (refer to step S230 in FIG. 3).

Next, the process returns to the main routine (not illustrated), and after another required processing is executed, the above-described operation with focus given to the microcomputer 110 is repeated again.

On the other hand, in a case where the relationship of Vout>Vth is not established, that is, the output voltage Vout is lower than the determination reference voltage Vth (case of NO in step S200 in FIG. 3), the comparator 12 outputs a predetermined voltage corresponding to a logic value "0" as described above.

When the predetermined voltage corresponding to the logic value "0" is output from the comparator 12, in the error register 13, "writing of ground short-circuit/opening in the error register" is performed (refer to step S240 in FIG. 3).

That is, in the error register 13, a logic value "1" representing that the ground short-circuit/terminal opening occurs is written in the ground short-circuit/terminal opening register region as described above.

On the other hand, in the microcomputer 110, "reading-out from the error register" is performed (refer to step S250 in FIG. 3).

That is, in the microcomputer 110, reading-out of logic value data of the logic value "1" from the ground short-circuit/terminal opening register region of the error register 13 is performed.

Next, in the microcomputer 110, on the basis of the logic value "1" read out from the ground short-circuit/terminal opening register region, "ground short-circuit/opening is determined", that is, it is determined that the ground short-circuit/terminal opening occurs in the second connection terminal 3*b* (refer to step S260 in FIG. 3).

Next, the process returns to the main routine (not illustrated), and after another required processing is executed, the above-described operation with focus given to the microcomputer 110 is repeated again.

FIG. 4 shows a waveform diagram schematically illustrating a waveform of a main part for explaining a temporal relationship between On and Off of the drive transistor 4 and the above-described abnormality detection processing, and hereinafter, the temporal relationship between On and Off of the drive transistor 4 and the abnormality detection processing will be described with reference to the same drawing.

In FIGS. 4(A) to 4(C), any horizontal axis represents a time axis.

In addition, the vertical axis in FIG. 4(A) represents a voltage, the vertical axis in FIG. 4(B) represents a current, and the vertical axis in FIG. 4(C) represents a voltage.

In FIG. 4, a period of time t0 to time tb is a period in which the drive transistor 4 is in an Off-state, and a period of time tb to time tc is a period in which the drive transistor 4 is in an On-state.

Since energization control to the solenoid 1*a* by the drive transistor 4 is similar as in the related art, any of a variation example of the output voltage Vout in the second connection terminal 3*b* in accordance with On and Off of the drive transistor 4 as illustrated in FIG. 4(A), a variation example of an energization current Is flowing through the solenoid 1*a* through the second connection terminal 3*b* as illustrated in FIG. 4(B), and a variation example of the output voltage Vdet of the resistance detection voltage amplifier 130 as illustrated in FIG. 4(C) are similar as in the related art.

In a circuit in the related art in which the resistance detection voltage amplifier 130 is used for detection of the battery short-circuit, the ground short-circuit, and the terminal opening, after the drive transistor 4 is turned off, until the drive transistor 4 is turned on after passage of time from time t0 to time ta which is a period in which a transient response caused by inductance occurs, that is, only in a period from time ta to time tb, the battery short-circuit, the ground short-circuit, and the terminal opening can be detected.

In contrast, according to the embodiment of the invention, the ground short-circuit/terminal opening can be detected by the comparator 12 during an Off-state of the drive transistor 4, that is, from the time t0 to time tb without limitation to specific timing (refer to step S200 to step S260 in FIG. 3).

In addition, the battery short-circuit can be detected by the resistance detection voltage amplifier 130 during an On-state of the drive transistor 4, that is, from the time tb to time tc without limitation to specific timing (refer to step S110 to step S180 in FIG. 2).

FIG. 5 is an explanatory view for collectively explaining the relationship between On and Off of the above-described drive transistor 4 and the abnormality detection, and hereinafter, contents thereof will be described with reference to FIG. 5.

In the explanatory view shown in FIG. 5, "ECU terminal state" in an upper-left column of paper represents an electrical state in the first and second connection terminals 3*a* and 3*b* of the electronic control unit 100 for vehicles, and in the column, "normal", "VB short-circuit", "ground short-circuit", and "terminal opening" are classified and shown.

Here, "normal" represents a state in which the battery short-circuit (VB short-circuit) or the ground short-circuit/terminal opening does not occur, and energization control of the solenoid 1*a* by the drive transistor 4 is normally performed.

In addition, "VB short-circuit" represents a state in which the battery short-circuit occurs, the "ground short-circuit" represents a state in which the second connection terminal 3*b* and the ground are connected, and "terminal opening" represents a state in which connection between the second connection terminal 3*b* and the solenoid 1*a* is cut off.

Note that, as described above, in the embodiment of the invention, it is not possible to distinguish which abnormal state occurs through the comparison operation using the comparator 12, but the "ground short-circuit" and the "terminal opening" are described separately here for the purpose of explaining that circuit operations are the same as each other.

Next, in FIG. 5, in a column noted as "FET voltage state" on a right side of the "ECU terminal situation", voltages of the second connection terminal 3*b*, which correspond to On and Off of the drive transistor 4 with respect to respective classification of the "ECU terminal situation" on the left column, are shown, respectively.

Hereinafter, each column of the "FET voltage state" will be described appropriately with reference to FIG. 2 to FIG. 4.

First, in a case where the ECU terminal state is a normal state and the drive transistor 4 is turned on, a voltage in the second connection terminal 3*b* becomes 0 V (refer to FIG. 4(A)).

Next, in a case where the ECU terminal state is the VB short-circuit (battery short-circuit), and the drive transistor 4 is turned on, an overcurrent flows through the shunt resistor 5. In this case, the battery short-circuit is detected by the microcomputer 110 on the basis of overcurrent detection (refer to step S110 to step S150 in FIG. 2).

Next, in a case where the ECU terminal state is the ground short-circuit or the terminal opening, and the drive transistor 4 is turned on, the voltage in the second connection terminal 3*b* becomes 0 V in any case.

Since this case cannot be distinguished from a case where the operation of the drive transistor 4 is in a normal state, determination as to whether the ground short-circuit/terminal opening occurs by the microcomputer 110 is not made as described above.

Next, in a case where the ECU terminal state is in a normal state, and the drive transistor 4 is turned off, the voltage in the second connection terminal 3*b* becomes the battery voltage VB (refer to FIG. 4(A)).

Next, in a case where the ECU terminal state is the battery short-circuit, and the drive transistor 4 is turned off, the voltage in the second connection terminal 3*b* becomes the battery voltage VB.

Next, in a case where the ECU terminal state is the ground short-circuit or the terminal opening, and the drive transistor 4 is turned off, the voltage in the second connection terminal 3*b* becomes approximately 0 V. In this case, the battery short-circuit/terminal opening is detected by the microcomputer 110 on the basis of an output of the comparator 12 (refer to step S200, and step S240 to step 260 in FIG. 3).

As described above, in the purge valve driving control device according to the embodiment of the invention, in a case where the drive transistor 4 is turned off, the ground short-circuit/terminal opening can be detected by the comparator 12 provided in the driver circuit 120, in a case where the drive transistor 4 is turned on, the battery short-circuit can be detected by the overcurrent detection operation using the drive transistor 4, and differently from the related art, abnormality detection is not limited to an extremely short period, earlier abnormality detection is possible in comparison to the related art.

Furthermore, since the drive transistor 4 can be used, simplification of a configuration is realized.

In addition, differently from the related art, since the output voltage of the resistance detection voltage amplifier 130 is not used for detection of presence or absence of abnormality in the first and second connection terminals 3*a* and 3*b*, and is applied only for detection of a solenoid resistance value, in comparison to the related art, higher resolution and accuracy of the solenoid resistance value detection can be secured.

The invention is applicable to a purge valve driving control device in which abnormality detection is desired with a circuit configuration that utilizes an existing circuit as much as possible while securing resolution and accuracy of solenoid resistance value detection.

The invention claimed is:

1. A purge valve driving control device, comprising:

a driver circuit configured to perform energization to a solenoid of a solenoid type purge valve;

a resistance detection voltage amplifier;

a battery voltage detection circuit; and a microcomputer configured to control a valve opening degree of the solenoid type purge valve through the driver circuit according to a determined solenoid resistance value, wherein a battery voltage is applied to one end of the solenoid through a first connection terminal provided in the purge valve driving control device, and the other end of the solenoid is connected to a second connection terminal provided in the purge valve driving control device, in the driver circuit, a drive transistor as a low-side transistor and a shunt resistor are provided between the second connection terminal and a ground and are connected in series in the order of the drive transistor and the shunt resistor from a side of the second connection terminal, an overcurrent detection circuit configured to detect occurrence of an overcurrent in the drive transistor on the basis of a voltage of the shunt resistor is provided, the battery voltage detection circuit detects and outputs the voltage battery to the microcomputer, the resistance detection voltage amplifier including a first input stage connected to the first connection terminal and a second input stage connected to the second connection terminal, the resistance detection voltage amplifier is configured to amplify and output a detection voltage to the microcomputer, and the microcomputer is configured to determine presence or absence of occurrence of battery short-circuit equivalent to an electrical short-circuit state of the first connection terminal and the second connection terminal on the basis of an output of the overcurrent detection circuit and is configured to determine the solenoid resistance value on the basis of the detection voltage output by the resistance detection voltage amplifier and the voltage battery output from the battery voltage detection circuit.

2. The purge valve driving control device according to claim 1, wherein the driver circuit is provided with a comparator that enables detection of occurrence of ground short-circuit equivalent to a short-circuit state between the second connection terminal and the ground, or terminal opening in which connection between the second connection terminal and the solenoid is cut off on the basis of comparison of a voltage of the second connection terminal and a determination reference voltage, and the microcomputer is configured to determine presence or absence of occurrence of ground short-circuit/terminal opening that is either the ground short-circuit or the terminal opening on the basis of an output of the comparator.

3. The purge valve driving control device according to claim 2, wherein the driver circuit is provided with an error register configured to separately write and accumulate predetermined logic value data corresponding to presence or absence of detection of the overcurrent by the overcurrent detection circuit, and predetermined logic value data corresponding to presence or absence of detection of the ground short-circuit or the terminal opening by the comparator, and the microcomputer is configured to determine presence or absence of occurrence of the battery short-circuit, and the ground short-circuit/terminal opening on the basis of the logic value data in the error register.

* * * * *